(12) United States Patent
Jo et al.

(10) Patent No.: US 7,229,574 B2
(45) Date of Patent: Jun. 12, 2007

(54) METHOD OF MAKING NOVEL WATER-SOLUBLE AND SELF-DOPED POLYANILINE GRAFT COPOLYMERS

(75) Inventors: Won-Ho Jo, Kyeonggi-do (KR);
Yun-Heum Park, Kyeonngi-do (KR);
Keon-Hyeong Kim, Seoul (KR);
Woo-Jin Bae, Seoul (KR)

(73) Assignees: Seoul National University Industry Foundation, Seoul (KR); Cheil Industries, Inc., Kyeonggi-do (KR)

( * ) Notice: Subject to any disclaimer, the term of this patent is extended or adjusted under 35 U.S.C. 154(b) by 563 days.

(21) Appl. No.: 10/477,325

(22) PCT Filed: Sep. 1, 2003

(86) PCT No.: PCT/KR03/01779

§ 371 (c)(1),
(2), (4) Date: Nov. 10, 2003

(87) PCT Pub. No.: WO2005/010072

PCT Pub. Date: Feb. 3, 2005

(65) Prior Publication Data

US 2006/0175580 A1 Aug. 10, 2006

(30) Foreign Application Priority Data

Jul. 25, 2003 (KR) .................... 10-2003-0051225

(51) Int. Cl.
*H01B 1/00* (2006.01)
*H01B 1/06* (2006.01)
*C08G 75/00* (2006.01)
*C08G 73/00* (2006.01)
*C08F 283/00* (2006.01)

(52) U.S. Cl. .............. 252/500; 252/510; 528/422; 528/373; 525/540

(58) Field of Classification Search ............. 252/500, 252/510; 564/305; 528/422, 373; 525/540
See application file for complete search history.

(56) References Cited

U.S. PATENT DOCUMENTS 4,959,180 A * 9/1990 Armes et al. .......... 252/519.34
5,188,766 A * 2/1993 Eiffler .................... 252/500

FOREIGN PATENT DOCUMENTS

JP 5-98000 A 4/1993

(Continued)

OTHER PUBLICATIONS

Nguyen et al., "Water-Soluble Conducting Copolymers of o-Aminobenzyl Alcohol and Diphenylamine-4-sulfonic Acid," *Macromolecules*, vol. 27, (1994), pp. 7003-7005.

(Continued)

*Primary Examiner*—Lorna M. Douyon
*Assistant Examiner*—Jaison Thomas
(74) *Attorney, Agent, or Firm*—Sughrue Mion, PLLC

(57) ABSTRACT

The present invention relates to a method of preparing a novel water-soluble and self-doped polyaniline graft copolymer, wherein aniline was grafted onto a poly(styrenesulfonic acid-c-aminostyrene) backbone. The graft copolymer is useful for advanced applications such as electrode manufacture, EMI shielding, static electricity dissipation, metal anti-corrosion, electrochromic materials, sensors, functional film and marine-fouling prevention.

10 Claims, 6 Drawing Sheets

FOREIGN PATENT DOCUMENTS

JP  11-172104 A  6/1999
JP  2002-265781 A  9/2002

OTHER PUBLICATIONS

Hua et al., "Water-soluble self-acid-doped conducting polyaniline: poly(aniline-*co*-*N*-propylbenzenesulfonic acid-aniline," *Polymer*, vol. 41, (2000), pp. 813-815.

Tzou et al., "Improved Solution Stability and Spinnability of Concentrated Polyaniline Solutions Using N,N'-Dimethyl Propylene Urea as the Spin Bath Solvent," *Synthetic Metals*, vol. 69, (1995), pp. 109-112.

Bergeron et al., "Water-soluble Conducting Poly(aniline) Polymer," *J. Chem. Soc., Chem. Commun.*, (1990), pp. 180-182.

Cao et al., "Counter-ion induced processibility of conducting polyaniline and of conducting polyblends of polyaniline in bulk polymers," *Synthetic Metals*, vol. 48, (1992), pp. 91-97.

DeArmitt et al., "A novel *N*-substituted polyaniline derivative," *Polymer*, vol. 34, No. 1, (1993), pp. 158-162.

Shannon et al, "Preparation and Properties of Water-soluble, Poly(styrenesulfonic acid)-doped Polyaniline," *J. Chem. Soc., Chem. Cummun.*, (1994), pp. 643-644.

Tsutsumi et al., "Polyaniline-poly[*p*-styrenesulfonic acid-*co*-methoxy-oligo(ethylene glycol)acrylate] Composite Electrode for All-Solid-State Rechargable Lithium Battery," *J. Electrochem. Soc.*, vol. 142, No. 9, (Sep. 1995), pp. L168-L170.

Chen et al., "Synthesis of Water-Soluble Self-Acid-Doped Polyaniline," *J. Am. Chem. Soc.*, vol. 116, (1994), pp. 7939-7940.

Angelopoulos et al., "Water soluble conducting polyanilines: Applications in lithography," *J. Vac. Sci. Technol. B.*, vol. 11, No. 6, (Nov./Dec. 1993), pp. 2794-2797.

Kim et al., "Redox Cyclability of a Self-Doped Polyaniline," *J. Electrochem. Soc.*, vol. 141, No. 3, (Mar. 1994), pp. L26-L28.

Shuichi Maeda et al.; "New Reactive Polyelectrolyte Stabilizers For Polyaniline Colloids"; Eur. Polym. J; vol. 33; No. 3; pp. 245-253.

Yongjun Chen et al.; "Chemical Modification of Polyaniline Powders By Surface Graft Copolymerization"; Polymer; vol. 41; No. 9; 2000; pp. 3279-3287.

F.C. Loh et al.; "Surface Structure of Thermoplastic and Thermoset Films After Modification By Graft Copolymerization: Comparative Study By X-Ray Photoelectron Spectroscopy and Atomic Force Microscopy"; Journal of Vacuum Science & Technology; vol. 14; (1996); No. 3; pp. 1611-1620.

J. Liesegang et al.; "Electrical Conductivity Study of Surface-Modified Polymers"; Surface and Interface Analysis; vol. 28; No. 1; 1999; pp. 20-27.

Z.H. Ma et al.; "Thermally Induced Surface Graft Copolymerization With Concurrent Lamination of Polyaniline Films UnderAtmospheric Conditions"; International Journal of Adhesion & Adhesives; vol. 19; No. 5; 1999; pp. 359-365.

* cited by examiner

METHOD OF MAKING NOVEL WATER-SOLUBLE AND SELF-DOPED POLYANILINE GRAFT COPOLYMERS

TECHNICAL FIELD

The present invention relates to a method for synthesis of water-soluble and self-doped polyaniline graft copolymer. More particularly, tert-butoxycarbonyl-aminostyrene (BOC-AMS) was synthesized by reaction of aminostyrene (AMS) and di-tert-butyl dicarbonate ((BOC)$_2$), then copolymerized with sodium styrenesulfonate (SSNa). P(SSA-co-AMS) was prepared by elimination of the tert-butoxy carbonyl groups and aniline was graft copolymerized onto the P(SSA-co-AMS) which resulted in the novel water-soluble and self-doped poly(styrene-g-aniline) (PSSA-g-PANI).

BACKGROUND ART

Polyaniline is one of the extensively studied intrinsic conducting polymers and shows electrical conductivity after proton-doping or oxidation. It had been well known that polyaniline can be prepared with easiness, high yield and low cost of synthesis and also shows very high conductivity with excellent environmental stability in a conducting form. (MacDiarmid, A. G. In Conjugated polymers and Related Materials, The Interconnection of Chemical and Electronic Structure; Salaneck, W. R.; Lundstrom, I.; Ranby, B., Eds.; Oxford University Press, 1993, PP 73–98)

Poyaniline can be used in the advanced application such as secondary battery, light emitting diode, electrochromic materials and sensor because of it's excellent electrical and electrochemical and optical properties. For these applications, polyaniline should be prepared in a film or processable form. Thus, development of water-soluble polymers becomes important when commercial applications are considered. However, few solution processes have been reported because conducting polymers based on polyaniline are not soluble in common solvent due to the π-π interaction between the rigid polyaniline backbone.

In the latest 10 years, processable polyaniline that is soluble in organic solvent or water was developed by virtue of the advance in the research on solution process. Base form of polyaniline (emeraldine base) can be processed in solvent such as strong Lewis-acid, like N-methylpyrrolidone (NMP) (Tzou, K. T. and Gregory, R. V. Synth. Met. 1995, 69, 109) or concentrated sulfuric acid (Andreatta, A., Cao, Y., Chiang, J. C., Heeder, A. J. and Smith, P. Synth. Met. 1988, 26, 383). More recently, Conducting forms of polyaniline can be processed in a polar or non-polar solvent by using the acidic dopant such as dodecylbenzene sulfonic acid or camphorsulfonic acid (Cao, Y., Smith, P. and Heeder, A. J. Synth. Met. 1992, 48, 91).

The method for the preparation of water-soluble polyaniline has been also developed. Several methods such as the introduction of alkyl sulfonic acid group onto the nitrogen atom in polyaniline (Bergeron, J. Y., Chevalier, J. W. and Dao, Le H. J. Chem. Soc., Chem. Commun. 1990, 180; Chen, S. A. and Hwang, G. W. J. Am. Chem. Soc. 1994, 116, 7939), or chemical or electrochemical polymerization of anline-N-alkyl sulfonate (Bergeron, J. Y., Chevalier, J. W. and Dao, Le H. J. Chem. Soc., Chem. Commun. 1990, 180; Chen, S. A. and Hwang, G. W. J. Am. Chem. Soc. 1994, 116, 7939) were reported to prepare water-soluble polyaniline. More recently, it has been reported that water-soluble polyanline was prepared by polymerization of di-phenyl-4-sulfonic acid (DeArmitt, C., Armes, C. P., Winter, J., Uribe, F. A., Gottesfeld, J. and Mombourquette, C. Polymer 1993, 34, 158) or copolymerization of O-amino benzyl alcohol and diphenyl-4-sulfonic acid (Nguyen, M. T. and Diaz, A. F. Macromolecules 1994, 27, 7003).

Another method for the preparation of water-soluble polyaniline was synthesis of PANIs in the presence of a water-soluble polymeric acid [M. Angelopoulos, N. Patel, J. M. Shaw, N. C. Labianca and S. A. Rishton, J, Vac. Sci. Technol. B11, 2794(1993); K. Shannon, and J. E. Fernadez, J. Chem. Soc. Chem. Commum., 643(1994)].

The water-soluble polyaniline prepared by above methods can't be extracted and purified from the reaction solution and by-product after synthesis. Residual product and reagent that remains unreacted in the solution is very difficult to separate from water. Thus, the dialysis was conducted to purify the resulted polyaniline, but it takes much time and there is a doubt on the degree of purity. The excess water also should be extracted for the preparation of desired concentration of water-soluble polyaniline aqueous solution.

On the other hand, the electrochemical properties such as reversible oxidation/reduction and the stability during the potential swap cycle is very important when film or coatings of the solution-processed polyaniline are used in electrochemical applications. The most important factor that determines such properties is the ionic conductivity of the film. The diffusion rate of ions has effects on the reversibility of oxidation/reduction and the length of life. It has been reported that cycles of oxidation/reduction in N-alkyl sulfonic acid substituted polyaniline were over 100,000 in the acidic condition (Kim, E. M., Lee, M. H., Moon, B. S., Lee, C. and Rhee, S. B. J. Electrochem. Soc., 1994, 141, L26), in which the above method isn't applicable to the secondary battery or electrochromic material.

Recently, it has been reported that when the copolymer of poly(styrenesulfonic acid) and oligo ethyleneglycol acrylate was used for the dopant of polyaniline, the electrical property was enhanced (H. Tsutsumi, S. Fukuzawa, M. Ishikawa, M. Morita, and Y. Matsuda, J. Electrochem. Soc., 142, L168(1995)). In this case, the electrical property was preserved even after the 40 cycles of charging and dis-charging, but the polymerization method is very difficult and the solution process wasn't possible because the prepared polyaniline film couldn't be dissolved in solvent.

DISCLOSURE OF INVENTION

Thus, the demands for the conducting polyaniline, which is processable in aqueous media and don't need further doping with external dopant to solve the previous technical shortcomings have imposed on the development of the water-soluble and self-doped conducting polyaniline, which also has an excellent electrochemical properties.

The present invention is the preparation method for novel water-soluble and self-doped polyaniline graft copolymer, which is represented by the following formula 1.

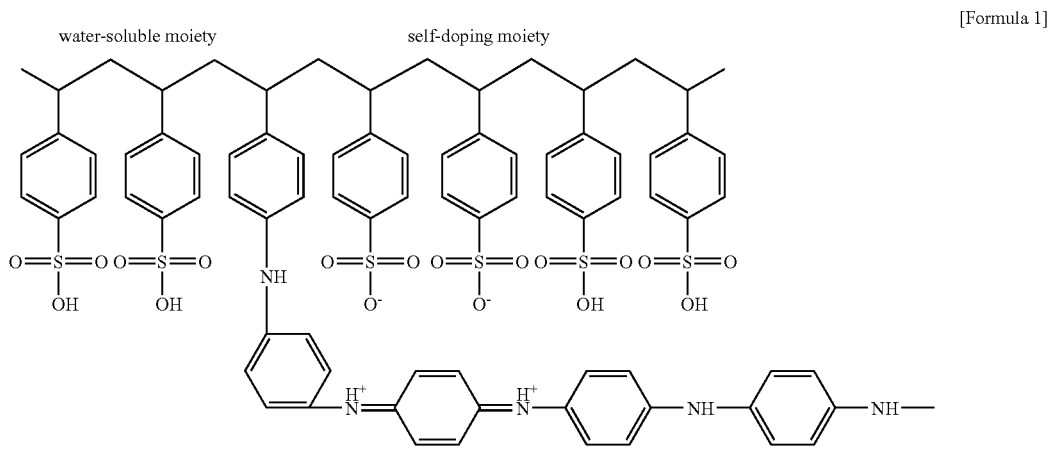

[Formula 1]

BRIEF DESCRIPTION OF THE DRAWINGS

The FIG. 1. Synthetic route for poly(styrenesulfonic acid-g-polyaniline (PSSA-g-PANI)

The FIG. 2. FTIR spectra of (a) P(SSNa-co-BOC-AMS), (b) P(SSA-co-AMS) and (c) PSSA-g-PANI, where Q, B and op denote the quinoid ring, benzenoid ring and out-of-plane, respectively.

Figure 3:
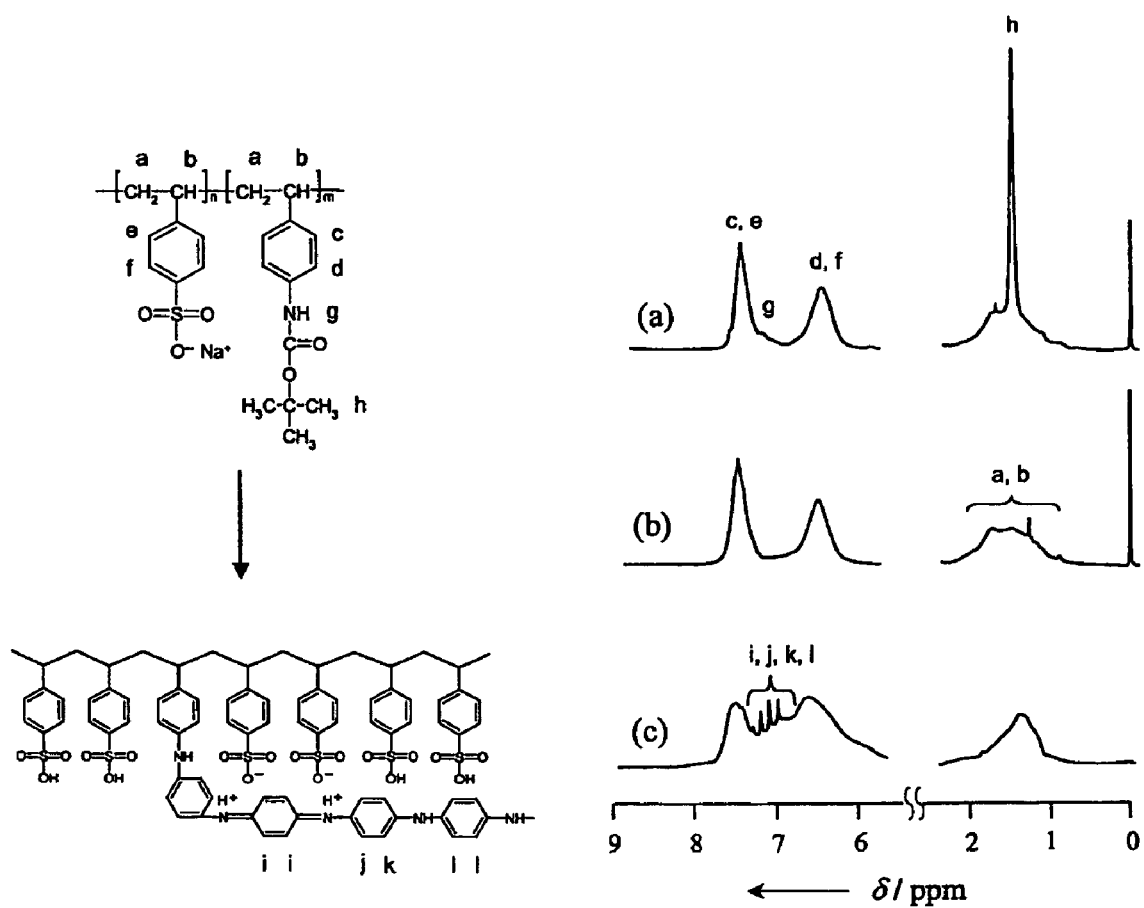

The FIG. 3. $^1$H NMR spectra of (a) P(SSNa-co-BOC-AMS), (b) P(SSA-co-AMS) in DMSO solution and (c) PSSA-g-PANI in D$_2$O solution.

Figure 4:
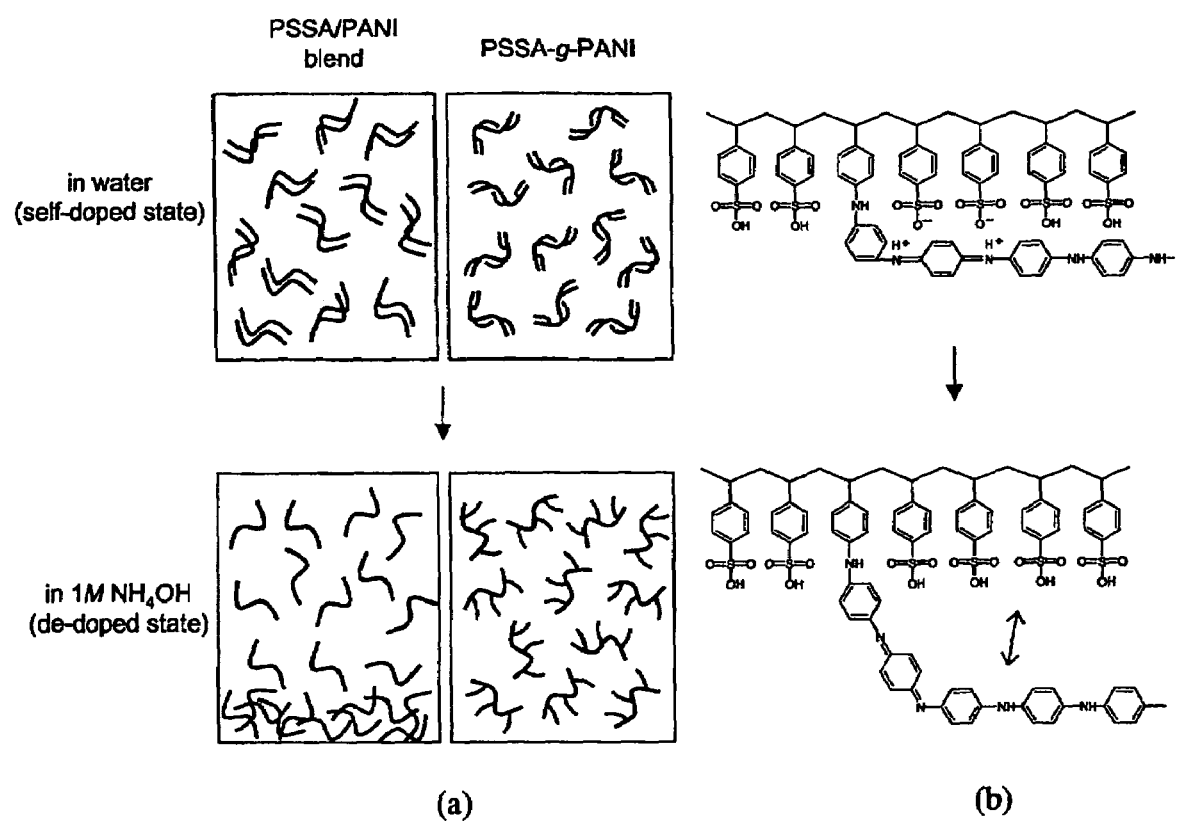

The FIG. 4. Schematic diagram of (a) doped and de-doped state of PSSA-g-PANI and PSSA/PANI blend, and (b) structural change of PSSA-g-PANI during de-doping process.

Figure 5:
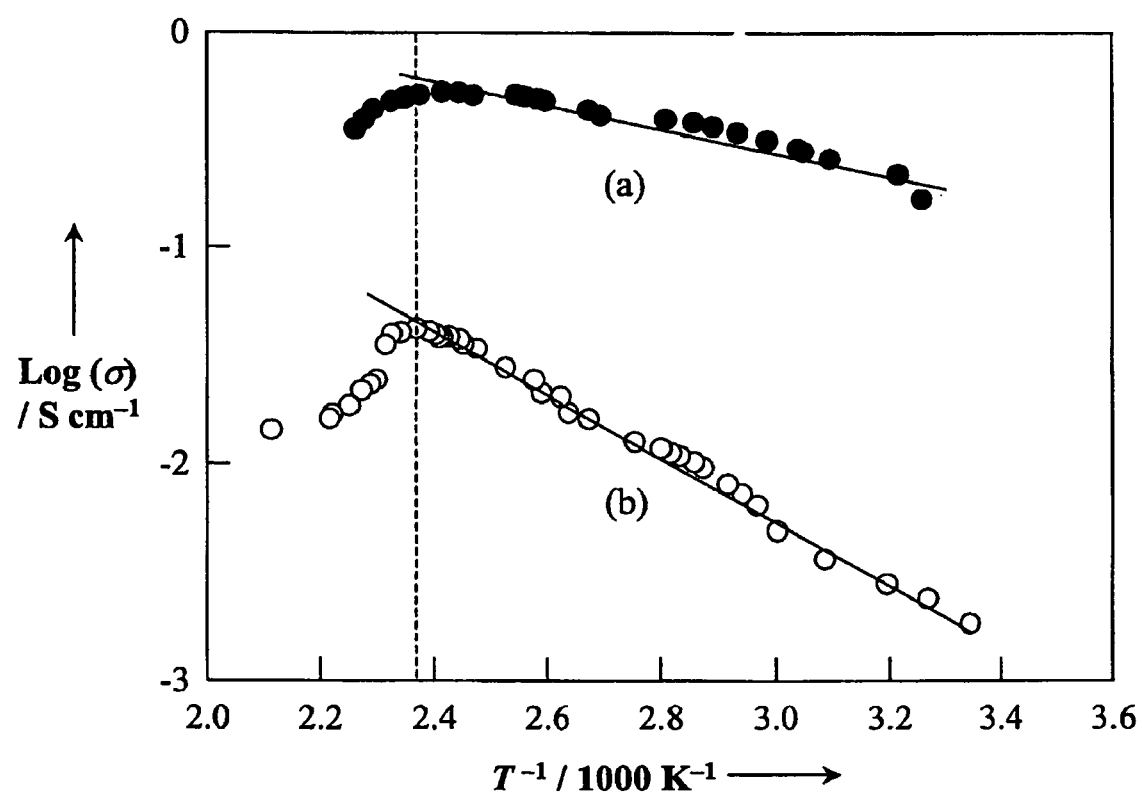

The FIG. 5. Temperature dependence of the conductivity of PSSA-g-PANI: (a) the first heating and (b) the second heating (from R.T. to above 160° C.)

Figure 6:
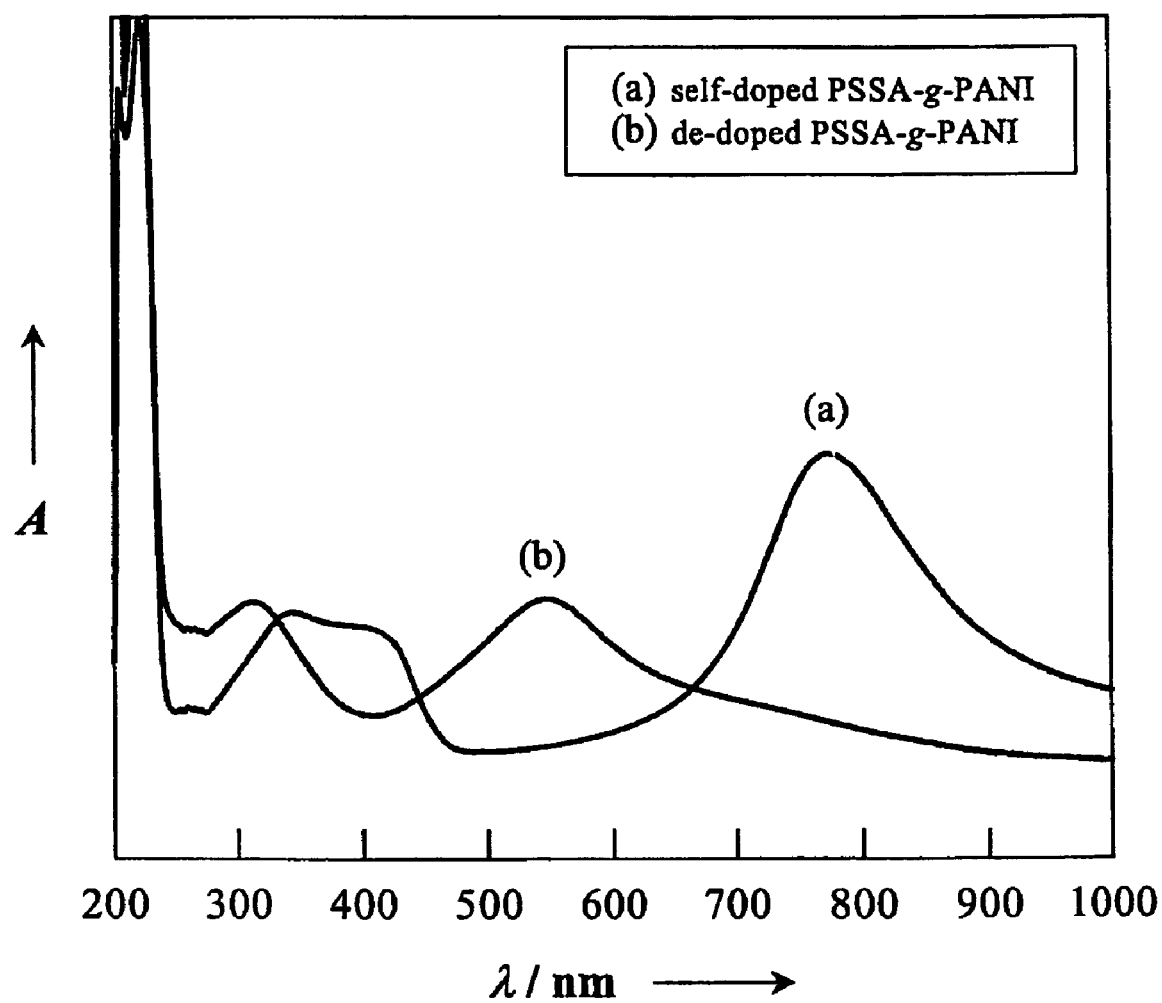

The FIG. 6. UV-visible spectra of PSSA-g-PANI: (a) self-doped state in aqueous solution and (b) de-doped state in aqueous NH$_4$OH (1 M) solution

BEST MODE FOR CARRYING OUT THE INVENTION

The objective of the present invention is the preparation of water-soluble and self-doped conducting polyaniline graft copolymer by graft copolymerization of aniline onto poly (styrenesulfonic acid) backbone.

In the present invention, as described in the following reaction formula 1 tert-butoxycarbonyl-aminostyrene (BOC-AMS) was synthesized from the reaction of aminostyrene (AMS) and di-tert-butyl dicarbonate ((BOC)$_2$).

P(SSNa-co-BOC-AMS) was synthesized by copolymerization of BOC-AMS and sodium styrenesulfonate (SSNa), as described in the following reaction formula 2.

As described in the following reaction formula 3, P(SSA-co-AMS) was prepared by elimination of the BOC groups in P(SSNa-co-BOC-AMS).

Then, PSSA-g-PANI (structural formula 1) was synthesized by grafting of aniline onto the P(SSA-co-AMS), as described in the following reaction formula 4.

[reaction formula 1]

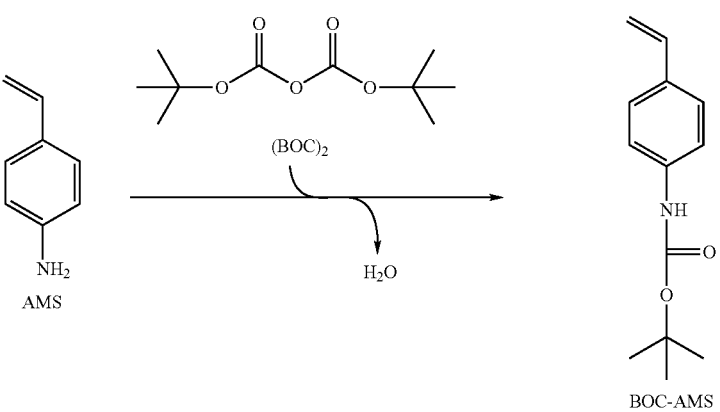

[reaction formula 2]
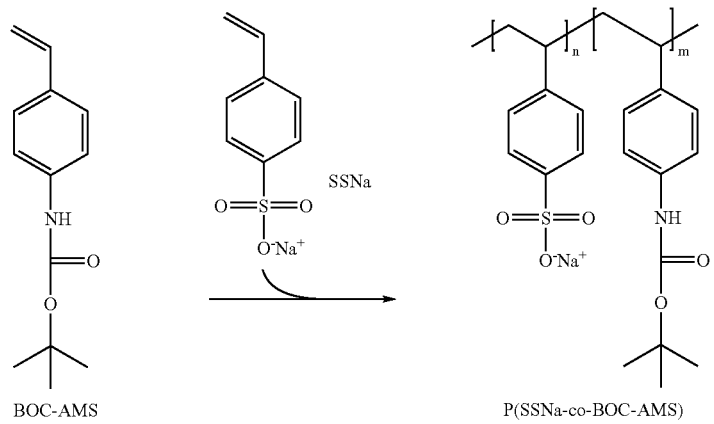
[reaction formula 3]
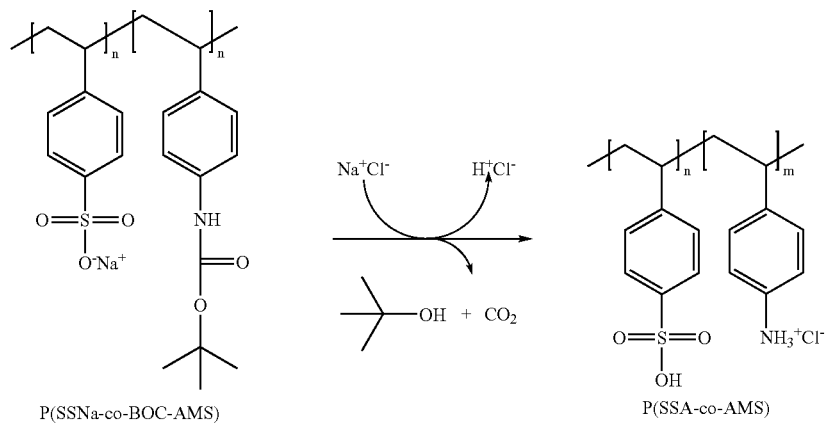
[reaction formula 4]
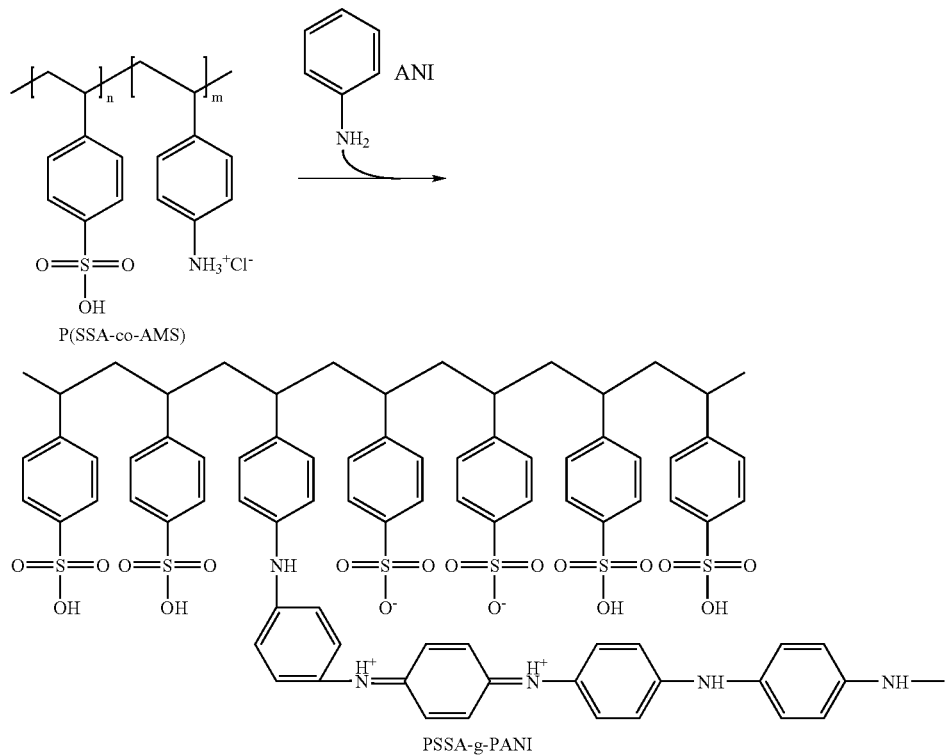

Figure 1:
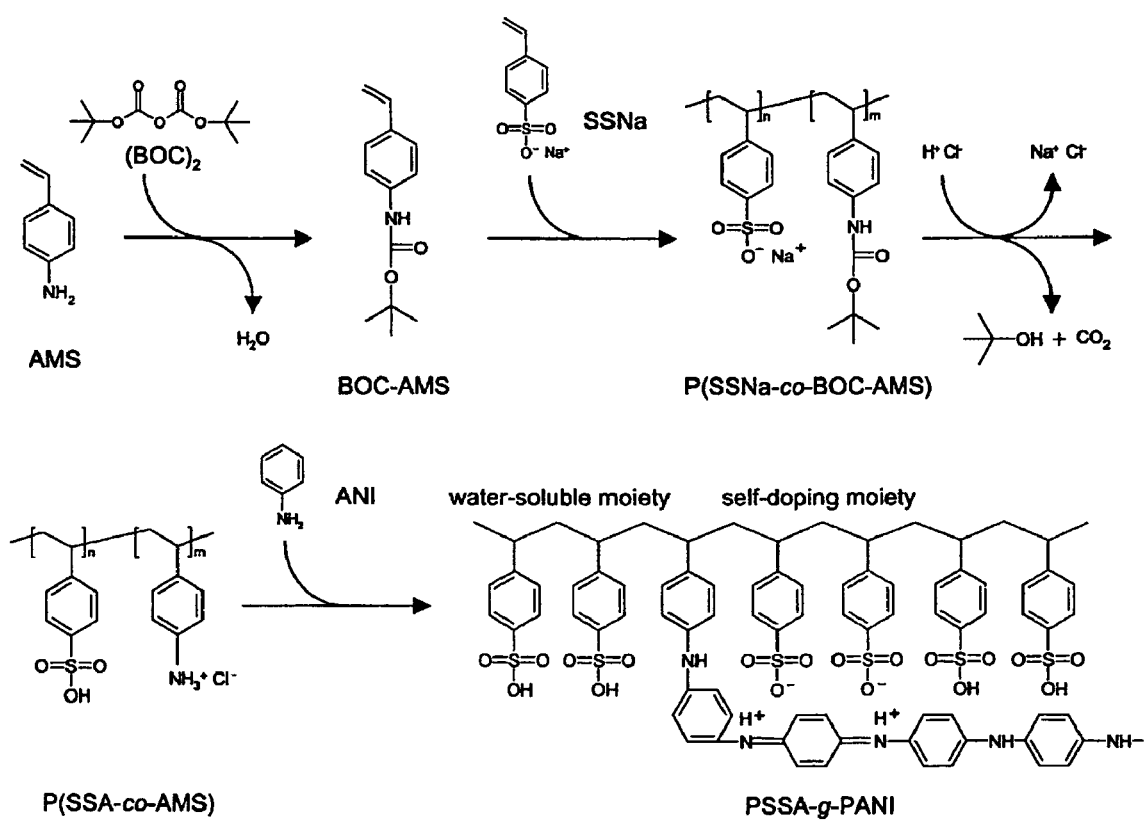

The entire experimental procedure represents in the FIG. 1 as chemical formula.

The preparation method for the synthesis of BOC-AMS in the present invention is explained concretely as following.

The synthesis of the BOC-AMS was carried out in order to reduce the transfer of lone-pair electron of amino group down to the vinyl group in para position and hinder any interaction either of the free radical initiator or of the growing chain. Indeed, aminostyrene submitted to homopolymerization or copolymerization with styrene by free radical initiator, only low molar mass products could be obtained in fairly poor yield.

AMS and $(BOC)_2$ in dioxane were reacted in the water/ice bath. After the solution was stirred for 10 h, 200 ml of ethyl acetate and 200 ml of water were added in sequence. The organic phase was then extracted and washed with plenty of water several times. Finally, the solvent was evaporated under reduced pressure.

The crude BOC-AMS was recrystallized from n-hexane to yield a white crystalline solid (yield 40%). The chemical structure of BOC-AMS was identified by 1 H NMR analysis. 1 HNMR (300 MHz, $CDCl_3$, 25 C, TMS): δ=1.5 (s, 9H; —$CH_3$), 5.1 (dd, 2H; =$CH_2$), 5.6 (dd, 2H; =$CH_2$), 6.6 (dd, 1H; =CH—), 6.7 (s, 1H; —NH—), 7.3 (s, 4H; Ar—H).

The preparation method for the copolymerization of BOC-AMS and sodiumstyrene sulfonate is explained concretely as follows.

P(SSNa-co-BOC-AMS) was synthesized by copolymerization of SSNa and BOC-AMS. SSNa (5 g), BOC-AMS (0.5 g), and AIBN (0.1 g) are dissolved in 60 ml of DMSO and polymerized at 80 C for 15 h under $N_2$ atmosphere. After polymerization, the product was precipitated into acetone, filtered, washed several times with acetone, and dried in vacuum oven at 60° C. for 24 h. The chemical structure of BOC-AMS was identified by FT-IR and 1 H NMR analysis, as described above.

The preparation method for the synthesis of PSSA-g-PANI in the present invention is explained concretely as follows.

Elimination of the BOC group from P(SSNa-co-BOC-AMS) and ion-exchange of Na+ with H+ were carried out in an acidic condition. P(SSNa-co-BOC-AMS) (0.8 g) was added to 30 ml of HCl aqueous solution (1M) at 30° C. for 1 h with stirring to yield P(SSA-co-AMS), and then the solution temperature was lowered to 0° C.

For graft copolymerization of ANI onto P(SSA-co-AMS), ANI (0.2 g) is first added to the P(SSA-co-AMS) solution for 0.5 h with stirring, and then 20 ml of ammonium persulfate (0.49 g)/HCl aqueous solution (1M) is dropwise added at 0° C. After 6 h of reaction, a dark green solution was obtained and then filtered. The filtered solution was further purified by dialysis using a semipermeable membrane (molecular weight cutoff, 3500).

Figure 2:
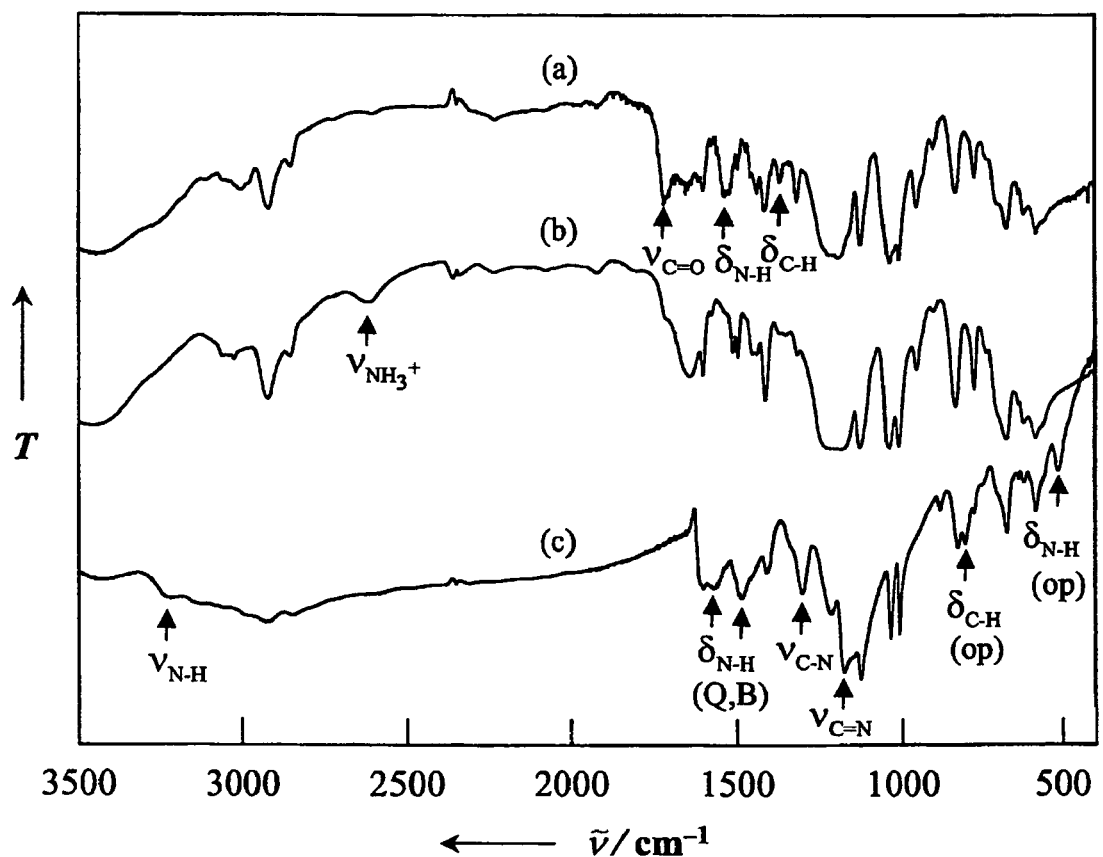

The chemical structure of PSSA-g-PANI obtained in the present invention was identified by FT-IR and $^1$H NMR analysis, shown in FIG. 2 and FIG. 3, respectively.

BOC group was removed from P(SSNa-co-BOC-AMS), the characteristic peaks of BOC group (1718, 1539, 1369 $cm^{-1}$) disappear and a new peak at 2618 $cm^{-1}$ from $NH_3^+$ stretching vibration is observed (FIG. 2(b)). The FTIR spectrum of PSSA-g-PANI shows that the peak at 2618 $cm^{-1}$ from $NH_3^+$ stretching vibration in P(SSA-co-AMS) almost disappears in PSSA-g-PANI, as shown in FIG. 2(c), indicating that PANI is successfully grafted onto P(SSA-co-AMS). The $^1$H NMR spectrum shown in FIG. 3 confirms the chemical structure proposed for the conducting PSSA-g-PANI copolymer (FIG. 1).

We also prepared a PSSA/PANI blend by the same procedure as PSSA-g-PANI except for use of PSSNa instead of P(SSNa-co-BOC-AMS), in order to compare its properties with those of PSSA-g-PANI. When the PSSA-g-PANI copolymer and PSSA/PANI blend were de-doped in $NH_4OH$ aqueous solution, the de-doped PANI in the PSSA/PANI blend was precipitated from the solution, whereas the de-doped PSSA-g-PANI changed its color from dark green to blue violet without precipitation, as schematically shown in FIG. 4. This also leads us to conclude that ANI is successfully grafted onto P(SSA-co-AMS) backbone. The macrophase separation of PANI can't take place in graft copolymer since the dopant is covalently bonded. After removal of $NH_4OH$ by purification, blue violet color of PSSA-g-PANI turned to dark geen color caused by re-doping. The doping de-doping occurs reversibly with pH variation.

When the electrical conductivity was measured in a compressed pellet form at room temperature after drying in vacuum at 30° C. over 24 h, the conductivities of PSSA-g-PANI copolymer and PSSA/PANI blend were $1.2 \times 10^{-1}$ S/cm and $7.7 \times 10^{-2}$ S/cm, respectively.

When the logarithm of conductivity is plotted against the inverse temperature, as shown in FIG. 5, it reveals that the plot is linear up to the temperature of 148° C., indicating that the charge transport follows the polaron hopping model (i.e. the temperature dependence of conductivity follows the Arrhenius law). At higher temperatures over 148° C., the conductivity decreases with increasing the temperature due to the occurrence of thermal de-doping. Higher thermal de-doping temperature than ring-substituted PANIs indicates that our PSSA-g-PANI is thermally more stable. (M. Y. Hua, Y. N. Su, S. A. Chen, Polymer 2000, 41, 813).

The UV-visible spectrum of PSSA-g-PANI shows that the polaron band transitions take place at 420 nm and 770 nm, as shown in FIG. 6(a), which indicates that the PSSA-g-PANI is in self-doped state. After de-doping of PSSA-g-PANI, the two peaks at 420 and 770 nm disappear and a new strong absorption peak appears at 550 nm due to π-π* transition of quinoid rings in PANI, as shown in FIG. 6(b).

The PSSA-g-PANI so obtained is completely soluble in water and polar solvent such as DMSO even after prolonged high vacuum drying to eliminate residual water. The Tyndall effect isn't also observed when re-dissolved in water.

The present invention is described in detail by examples. It should however be borne in mind that these examples are not the limit of the present invention but just specific examples.

EXAMPLE 1

Synthesis of Water-soluble and Self-doped Polyaniline Graft Copolymer (Change of the Backbone Molecular Weight)

P(SSNa-co-BOC-AMS) was synthesized by copolymerization of SSNa and BOC-AMS. SSNa (5 g), BOC-AMS (0.5 g), and AIBN (0.01~0.2 g) are dissolved in 60 ml of DMSO and polymerized at 80° C. for 15 h under $N_2$ atmosphere. After polymerization, the product was precipitated into acetone, filtered, washed several times with acetone, and dried in vacuum oven at 60° C. for 24 h. The obtained products were characterized by MALDI-ROF mass spectrum and have molecular weights about 1000~1000,000.

EXAMPLE 2

Synthesis of Water-soluble and Self-doped Polyaniline Graft Copolymer (Change of the Grafting Length)

P(SSNa-co-BOC-AMS) was synthesized by copolymerization of SSNa and BOC-AMS. SSNa (5 g), BOC-AMS (0.5 g), and AIBN (0.1 g) are dissolved in 60 ml of DMSO and polymerized at 80° C. for 15 h under N2 atmosphere. After polymerization, the product was precipitated into acetone, filtered, washed several times with acetone, and dried in vacuum oven at 60° C. for 24 h.

For graft copolymerization of ANI onto P(SSA-co-AMS), ANI is first added to the P(SSA-co-AMS) solution over the period of 0.5 h with stirring with the ANI/P(SSA-co-AMS) molar ratio from 0.1 to 100 and then 20 ml of ammonium persulfate/HCl aqueous solution (1M) is dropwise added at 0° C. The molar ratio of ammonium persulfae/ANI was 1.0. The obtained graft copolymers have anline units about 1~400 as an average grafting lengths and couldn't be solubilized in water when aniline unit are over 20. As the graft length increased, the sulfonic acid groups that participated in water-solubility decreased and it became insoluble.

EXAMPLE 3

Synthesis of Water-soluble and Self-doped Polyaniline Graft Copolymer (Change of the Density of the Grafting Sites)

P(SSNa-co-BOC-AMS) was synthesized by copolymerization of SSNa and BOC-AMS. SSNa (5 g), BOC-AMS (0.05~0.2 g), and AIBN (0.1 g) are dissolved in 60 ml of DMSO and polymerized at 80° C. for 15 h under N2 atmosphere. After polymerization, the product was precipitated into acetone, filtered, washed several times with acetone, and dried in vacuum oven at 60° C. for 24 h. The obtained products were characterized by $^1$H NMR spectrum and the BOC-AMS contents in the feed are the same as the contents in the product.

EXAMPLE 4

Synthesis of Water-soluble and Self-doped Polyaniline Graft Copolymer (pH Variation)

For graft copolymerization of ANI onto P(SSA-co-AMS), ANI (0.2 g) is first added to the P(SSA-co-AMS) (0.8 g) solution over the period of 0.5 h with stirring, and then 20 ml of ammonium persulfate (0.49 g)/HCl aqueous solution (0.1M~2M) is dropwise added at 0° C. After 6 h of reaction, a dark green solution was obtained.

EXAMPLE 5

Electrochemical Synthesis of Water-soluble and Self-doped Polyaniline Graft Copolymer The precursor film, P(SSNa-co-BOC-AMS), was spin-coated on a Pt disc electrode. The electrochemical polymerization of aniline onto P(SSNa-co-BOC-AMS) was performed by applying intended potential to the electrode using potentiostat (EG&G 273A). In this electrolysis, a standard three-electrode cell consists of a disk-type Pt working electrode (diameter, 1 cm), a plate-type Pt counter electrode, and an aqueous sodium chloride saturated calomel electrode (SCE) as a reference electrode was employed. The electrolyte solution was 1.0 M aqueous HCl in DMF/Water mixture. After anline was added to the solution, $N_2$ gas was purged for 1 h. The potential range for electrochemical polymerization and the scanning rate are −0.2~1.0V (vs. SCE) and 50 mV/sec, respectively.

EXAMPLE 6

Synthesis of Water-soluble and Self-doped Polyaniline Graft Copolymer (the Facile Synthesis Method Without Dialysis Procedure)

The water-soluble polyaniline prepared by above methods can't be extracted from the reaction solution after synthesis. This is because residual product and reagent that remains unreacted in the solution is very difficult to separate from water. Thus, the dialysis was conducted to purify the prepared polyaniline, but it takes much time and there is a doubt on the degree of purity. The excess water also should be removed for the preparation of desired concentration of water-soluble polyaniline aqueous solution. If the graft copolymer is precipitated and all the other agents are dissolved in solvent after synthesis, the products can be separated easily by filteration. In this example, the aceonirile/water (8:2) was chosen in order to satisfy these requirements. The precursor for the graft copolymerization, P(SSNa-co-BOC-AMS), monomer, and oxidant were completely dissolved in this co-solvent, however PSSA-g-PANI were not.

P(SSNa-co-BOC-AMS) (0.8 g) dissolved in acetonitrile/1M aqueous HCl (8:2) was stirred at 30° C. for 1 h. After temperature was lowered to 0° C., ANI (0.2 g) is first added to the P(SSA-co-AMS) solution over the period of 0.5 h with stirring, and then 20 ml of ammonium persulfate (0.49 g)/HCl aqueous solution (1M) is dropwise added at 0° C. After 6 h of reaction, a dark green solution was obtained and then filtered. PSSA-g-PANI was precipitated and remained on the filter paper, while all the others got through the filter paper. After washed with acetone several times, PSSA-g-PANI was vacuum-dried in oven at 30° C. for 24 h. Even after elimination of the residual water, PSSA-g-PANI was completely dissolved in water.

Synthesis of polyaniline is impossible in organic-solvent. Thus in this example, the synthesis of polyaniline was accomplished with the proper ratio of organic solvent/water co-solvent. The proper ratio (8:2) was chosen for the selective precipitation of graft copolymer.

INDUSTRIAL APPLICABILITY

As described above, the water-soluble and self-doped conducting polyaniline graft copolymer has the merit that water-soluble backbone moieties (sulfonic acid groups), which do not participate in self-doping, make the polymer soluble in water or polar organic solvent such as dimethyl sulfoxide (DMSO). The polymeric dopant (backbone poly (styrenesulfonic acid)) is so structurally stable in wide range of pH that macrophase separation by dopant migration can be prevented. The water-soluble and self-doped conducting polyaniline invented here will become a basic material for advanced applications such as electrode, EMI shielding, static electricity dissipation, metal anti-corrosion, electrochromic materials, sensor, functional film and marine-fouling prevention.

What is claimed is:

1. A method for preparing polyaniline graft copolymer represented by Formula (I)

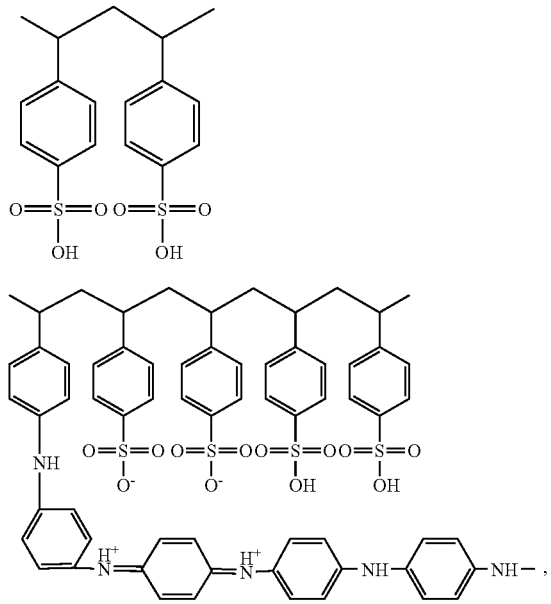

which comprises the steps of:
reacting aminostyrene (AMS) with di-tert-butyl-carbonate ((BOC)2) to give BOC-AMS;
copolymerizing BOC-AMS with sodium styrenesulfonate (SSNa) to give P(SSNa-co-BOC-AMS) of the following formula:

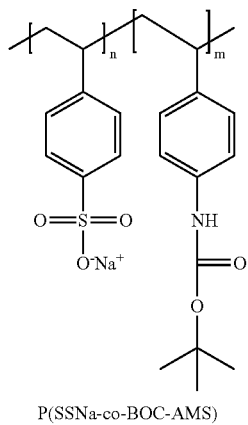

P(SSNa-co-BOC-AMS)

eliminating tert-butyl di-carbonate (BOC) from P(SSNa-co-BOC-AMS) to give P(SSA-co-AMS) of the following Formula (II):

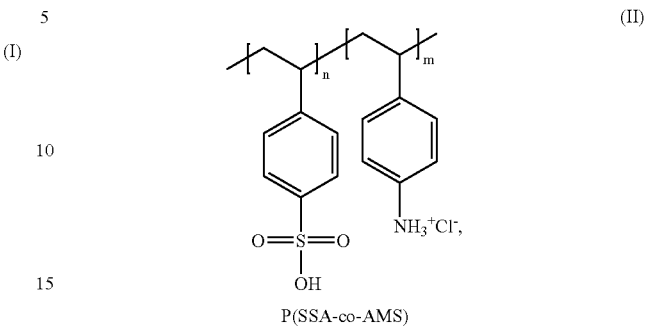

P(SSA-co-AMS)

wherein n is a numerical number from 1–5,000, inclusive, and m is a numerical number of 1–1,000, inclusive; and
grafting aniline onto the P(SSA-co-AMS) to give polyaniline graft copolymer of the Formula (I).

2. The method of claim 1, wherein the poly(styrenesulfonic acid-co-aminostyrene) (P(SSA-co-AMS)) has a molecular weight from $1.0 \times 10^3$ to $1.0 \times 10^6$ when determined by MALDI-TOF mass spectrum analysis.

3. The method of claim 1, wherein the grafting reaction of aniline onto poly(styrenesulfonic acid-co-aminostyrene) is performed at the temperature from −60 to 600° C.

4. The method of claim 1, wherein the weight ratio of the above poly(styrene-co-aminostyrene) (PSSA-co-AMS)/aniline is from 0.5 to 100.

5. The method of claim 1, wherein the grafting reaction of poly(styrenesulfonic acid-co-aminostyrene) (P(SSA-co-AMS)) with aniline is conducted via electrochemical synthesis method.

6. The method of claim 1, wherein the weight ratio of the sodium styrenesulfonate (SSNa)/BOC-AMS is from 5 to 100, for the radical copolymerization.

7. The method of claim 1, wherein sodium styrenesulfonate (SSNa) and BOC-AMS are dissolved in DMSO and subject to copolymerization using AIBN as an initiator.

8. The method of claim 1, wherein aminostyrene (AMS) and di-tert-butyl di-carbonate are reacted in dioxane in the ice/water bath from 5 hours to 20 hours.

9. The method of claim 1, wherein acetonitrile/water co-solvent is used as solvent when the BOC-AMS and sodium styrenesulfonate are copolymerized.

10. The method of claim 5, wherein Pt electrode coated by poly(styrenesulfonic acid-co-aminostyrene) (P(SSA-co-AMS) as an working electrode, SCE as reference electrode and Pt wire as counter electrode are used in the electrochemical synthesis of polyaniline graft copolymer.

* * * * *